April 19, 1932.  J. SONANDER  1,854,811
SEED DRILL
Filed Jan. 13, 1930
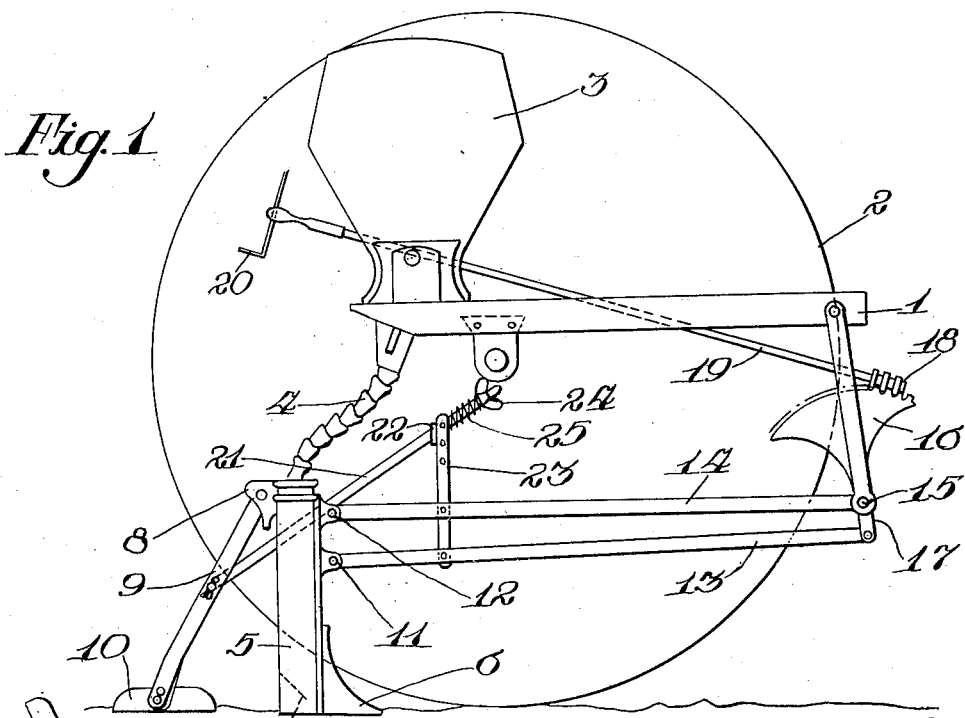
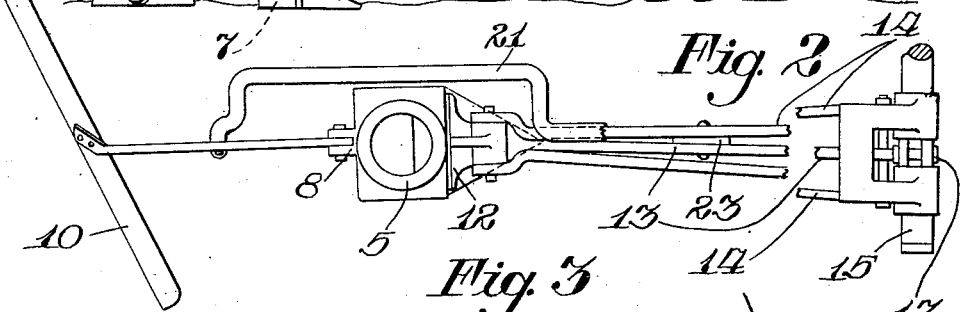
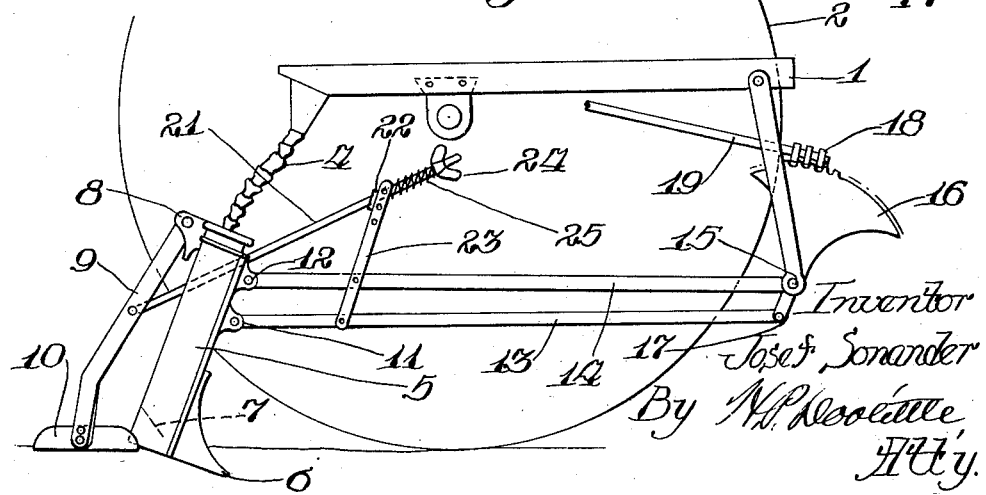
Inventor
Josef Sonander
By N. P. Deveille
Atty.

Patented Apr. 19, 1932

1,854,811

UNITED STATES PATENT OFFICE

JOSEF SONANDER, OF NORRKOPING, SWEDEN, ASSIGNOR TO INTERNATIONAL HARVESTER COMPANY, A CORPORATION OF NEW JERSEY

SEED DRILL

Application filed January 13, 1930, Serial No. 420,358, and in Sweden, Great Britain, and Czechoslovakia January 28, 1929.

The present invention relates to seed drills having a shoe or hoe-type coulter or furrow opener, and especially to improvements in said coulter and to the tool or implement which follows behind the coulter to cover the seed after it has been deposited in the furrow.

In seed drills of the above mentioned type and also of the so-called disc type, the shoe or disc prepares a comparatively deep furrow or trench for the seed and, after the seed has been delivered in a narrow line, it becomes covered by the earth which falls onto it from the walls of said furrow or trench. In some cases the covering is effected more positively by a chain or other device attached to the shoe or disc.

As before mentioned, such machines sow the seed in comparatively deep and narrow furrows, and it is now generally believed that in many soil conditions and in some climates deep sowing of this kind does not produce the best results and that with shallow sowing more seeds germinate and healthier plants result.

Other types of sowing machines have been devised to scatter the seed over the ground so that the seed is delivered as in hand broadcasting. This method is wasteful, because many of the seeds do not germinate, many are eaten by birds and, moreover, owing to the uneven deposit of the seeds, a number may fall in the same spot and be too closely placed to allow for the proper development of the resulting plants.

The chief object of this invention is to provide on a sowing machine an improved shoe or coulter which will open a comparatively wide and shallow furrow and then scatter the seeds over this furrow, the seeds being thereafter thinly covered with earth by a following blade of special form.

A further feature of the invention is to provide that the seed is always covered with a uniform covering of earth although the depth of the furrow prepared by the shoe or coulter be varied by the adjusting means provided on the machine.

Briefly stated, these objects are attained by providing each seed-tube on a sowing machine with a special shoe or coulter comprising a comparatively wide tubular portion for delivering the seed to the soil and a correspondingly wide hoe portion for preparing the furrow, each such coulter having associated therewith a covering blade or implement. When the coulter is drawn through the soil, it opens a wide furrow and, owing to a projecting lip or baffle provided in the tubular part on which the seed impinges as it falls to the soil, the seed is scattered over the furrow and is thereafter uniformly covered with earth by the covering blade. The coulters or shoes are adjustable so as to vary the depth of sowing and, according to the invention, during such adjustment, the covering tool is simultaneously adjusted with the coulter so that it maintains a constant relation with regard to the surface of the soil at all positions assumed by the coulter.

These and other features of the invention will be better understood by reference to the attached drawings of which:

Figure 1 shows a side view of a sowing machine provided with the improved coulter and covering blade or tool;

Figure 2 shows a corresponding plan view of the coulter and the associated parts; and, Figure 3 is similar to Figure 1 showing the coulter in an adjusted position.

Referring to the figures, the machine comprises the frame 1 mounted on wheels 2, one of which is shown in outline, and seed hopper 3. The hopper is provided with a number of outlets, each of which is connected to a flexible seed-tube 4. The seeds are ejected into the tubes by mechanism associated with the hopper. The above mentioned parts are well known and form no part of the present invention and are, therefore, not shown in any detail.

The end of each flexible seed tube passes into a shoe through which the seeds are conveyed to the soil. This shoe consists of the comparatively large tubular part 5 which may be of square or other suitable section, and the hoe point 6, cast integrally with the tube or secured to it in any convenient manner. At the lower end of the tube 5 a portion is cut out and bent forwardly into the tube to form the projecting lip or baffle 7.

The top of the tube 5 has a shoulder or reinforcing piece 8 to which is pivotally connected the arm 9 carrying at its lower end the covering blade 10. The arm 9 is twisted or bent so that the edge of the blade 10 is angularly disposed with regard to the front of the machine, as shown in Figure 2. On one side of the tube 5 are two bosses or pivots 11 and 12, which form pivotal connecting points for the drawbars or rods 13 and 14. The front end of bar 14 is pivotally supported on a shaft 15 which extends across the machine while the corresponding end of bar 13 is pivotally connected to crank-arm 17, there being one such crank 17 for every bar 13. At a point along the shaft 15 is clamped the tilting sector 16 which is provided with teeth in mesh with worm 18, the latter being connected to shaft 19, which may be rotated by crank-handle 20.

At about the center of arm 9 is pivotally connected a rod 21 bent round the tube 5, as shown in Figure 2. The rod passes through a swivel collar 22 provided on links 23. The end of the rod is threaded and has a thumb-screw 24 which compresses spiral spring 25 against the collar. The link 23 is pivotally connected to drawbars 13, 14.

Figure 2 shows a preferred form of the hoe point 6; it will be seen that the lower portion which opens the furrow is pointed and occupies nearly the whole breadth of the tube 5, so that the hoe therefore, makes a comparatively broad furrow.

When the machine is drawn along in the field, the coulters 6 form the furrows in the soil, and the rotation of the ground-wheels 2 causes the operation of mechanism (not shown) associated with the hopper to eject the seeds into the flexible seed tubes 4. The seeds fall into delivery tubes 5 and during their descent impinge on the baffles 7, these baffles being so arranged that the seeds are thrown off and become sprinkled or scattered over the furrows prepared by the coulters. The seeds are then covered by the covering blade 10, which follows closely behind the coulters. Owing to the edge of the covering blade being arranged so as to lightly scrape the surface of the ground, it covers the seed thinly and uniformly with the earth displaced by the coulter.

The tilting sector 16 is provided for the purpose of adjusting the digging depth of the coulter 6 by changing its angle with relation to the ground. By rotation of the handle 20, the sector may be moved from a position shown in Figure 1 of the drawings to intermediate positions, up to the extreme position indicated in Figure 3.

The sector turns shaft 15 and imparts motion to the crank arm 17, so causing the arms to push rods 13. Since bars 14 remain stationary, the movement of rods 13 causes the tubes 5 to be tilted so that the hoes 6 will change their angular position with relation to the ground. Owing to the link connection 23 between drawbars 13, 14, and arm 9 of the covering blade, a lifting movement will be imparted to the blade as the tubes 5 are tilted by the movement of the tilting sector and this lifting movement will proceed in a regular manner with the tilting of tubes 5 and, therefore, regularly with the change in angular relation of hose 6 to the ground.

It will thus be appreciated that when the shoe is adjusted to vary the depth of the furrow, the edge of blade 10 will always be maintained at the level of the surface of the ground.

Figure 3 shows that blade 10 is still at ground level although the tilting sector is at its extreme position of adjustment to cause the hoe point 6 to dig into the ground to make a comparatively deep furrow or trench.

It is usual on sowing machines having sowing shoes to provide means to prevent damage to the shoe, should it meet an obstruction during the operation of the machine, and it may be assumed that suitable means are provided to this end in the present case, such as, for instance, the insertion of a wooden break-pin at pivot 11. Since, however, the covering blade described herein is much wider than the shoe, special means are provided to protect it. As has been mentioned, the rod 21 holding arm 9 of the blade is slidably supported in collar 22 against the tension of spiral spring 25. If the blade meets an obstruction, the rod 21 will slide in collar 23, so allowing the blade to be deflected, and to pass the obstruction without damage.

The adjusting nut 24 is provided to permit of variation of the tension of spring 25, so that the amount of resistance offered by the blade 10 to the soil may be altered conformably with varying ground conditions and kinds of soil.

Should it be desired to adjust the position of the covering blade relative to the soil, this may be done by raising or lowering the rod 21 on the link 23. To this end, a number of holes are provided in the link 23, so that collar 22 may be fixed at different positions on the link according to desire.

In the figures, the baffle 7 is shown as a straight inclined plane, but it may be curved or provided with humps or otherwise formed to give the desired sprinkling or scattering movements to the seeds impinging on it.

The improved shoe may be added to sowing machines which deposit fertilizer together with the seed.

It is to be understood that the improved shoe of this invention may be utilized wherever found desirable and that it may take any form which falls within the scope of the appended claims.

What is claimed is:

1. In a grain drill, a furrow opener, a covering element attached to said opener, means for varying the depth of penetration of the furrow opener, and means connected to said depth varying means and to the covering element operative to move said element in a direction opposite to the movement of the furrow opener thereby maintaining the covering means in a substantially uniform position with respect to the surface of the soil.

2. In a grain drill, a shoe having a furrow opener associated therewith, means for varying the depth at which said furrow opener operates in the soil, a covering element attached to the shoe for relative movement with respect thereto, and means operatively connecting said element with the furrow opener depth varying means, said means being adapted to raise said element substantially the same distance that the opener is lowered, thereby maintaining the covering element in a substantially uniform position with respect to the surface of the soil.

3. In a grain drill, a shoe having a furrow opener associated therewith, a covering element pivotally attached to the shoe, a pair of longitudinally extending draft members pivotally attached to the shoe, means for altering the relative longitudinal position of said members thereby obtaining variable penetration of the furrow, and means operatively connected to the draft members and to the covering element adapted to maintain said element in a substantially uniform position with respect to the surface of the soil.

4. In a grain drill, a shoe having a furrow opener associated therewith, a covering element pivotally attached to said shoe, draft means connected to said shoe, means for varying the angular position of the shoe with respect to the draft means, and means connecting the draft means and the covering element operative to move said element in a vertical direction opposite to the movement of the furrow opener and to thereby maintain said element in a substantially uniform position with respect to the surface of the soil.

5. In a grain drill, a frame structure, a shoe having a furrow opener associated therewith, a horizontally extending draft member pivotally joined to the shoe at one end and to the frame structure at the other end, a second draft member pivoted to the shoe and to a depth regulating means mounted on the frame structure, a furrow covering element pivotally attached to the shoe, means operatively connecting said element to the draft members whereby said element is raised with respect to the surface of the soil when the furrow opener is lowered with respect thereto.

6. In a grain drill, a frame structure, a shoe having a furrow opener associated therewith, a horizontally extending draft bar pivotally joined to the shoe and to the frame structure, a rotatable crank element pivoted on the frame structure, a second draft bar pivoted to the shoe at a point spaced from the connection point of the first named draft bar and to said crank element, a furrow covering element pivotally connected to the shoe, a lever pivoted to each of the draft bars intermediate their ends, and means connecting said lever to the covering element.

7. In a grain drill, a frame structure, a hopper mounted on said structure, a shoe consisting of a seed directing means and furrow opening means, a horizontally extending draft bar pivotally joined to the shoe and to the frame structure, an adjusting member pivoted for oscillation on the frame structure, a second draft bar pivoted to the shoe at a point spaced below the connection point of the first mentioned draft bar, said second draft bar being substantially parallel to the first and being pivotally joined to the adjusting member, a furrow covering element pivoted to the shoe at a point near the upper end thereof, a lever pivoted to each of the draft bars intermediate their ends and extending upwardly therefrom, a link resiliently pivoted to the upper end of said lever and to the covering element at a point intermediate its ends, and means for manually operating the adjusting member.

In testimony whereof I affix my signature.

JOSEF SONANDER.